April 18, 1933.  W. C. BETZ  1,904,264
SPRING SHACKLE
Original Filed Oct. 28, 1924
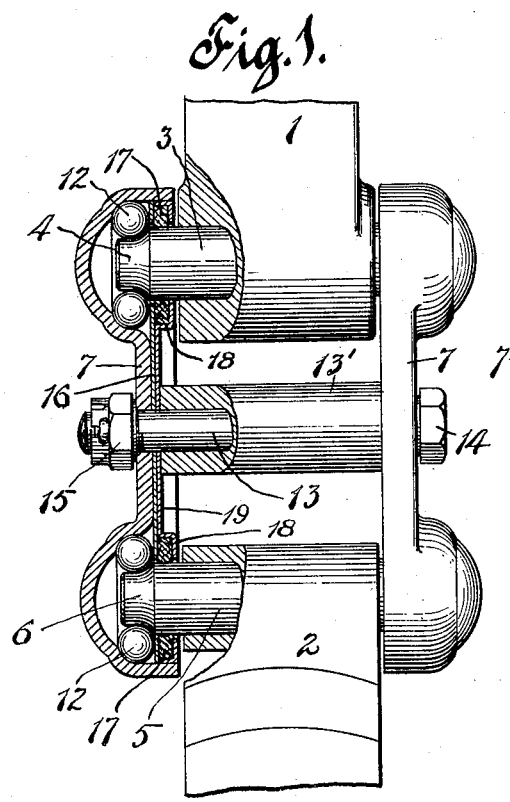
Fig. 1.
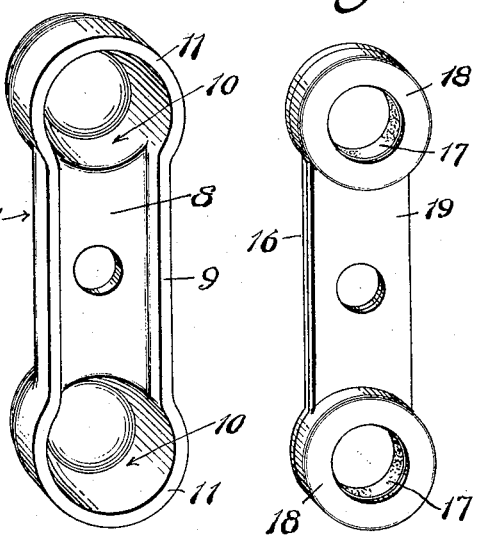
Fig. 2.
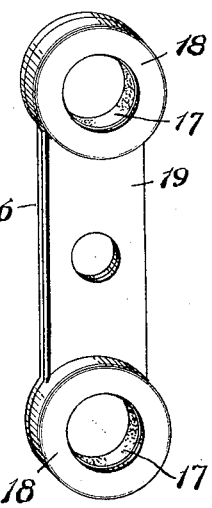
Fig. 3.
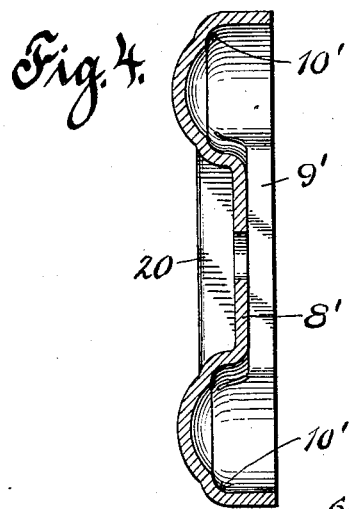
Fig. 4.
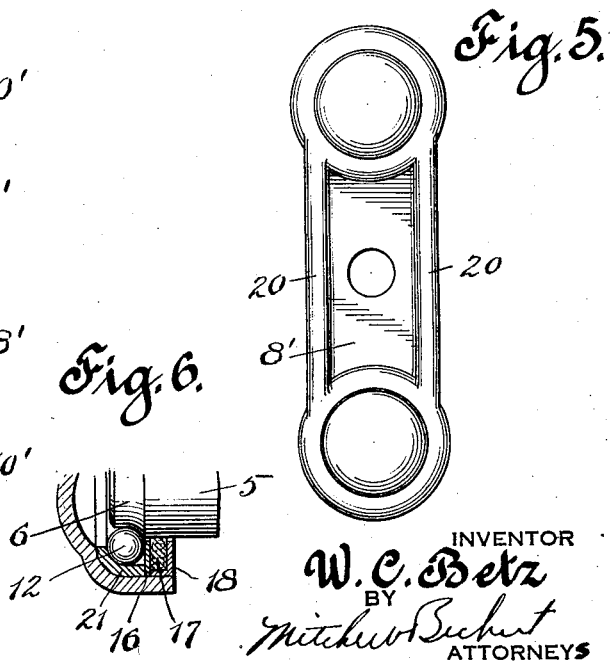
Fig. 5.
Fig. 6.
INVENTOR
W. C. Betz
BY
Mitchell Bechert
ATTORNEYS Patented Apr. 18, 1933

1,904,264

UNITED STATES PATENT OFFICE

WILLIAM C. BETZ, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING SHACKLE

Original application filed October 28, 1924, Serial No. 746,328. Divided and this application filed September 11, 1930. Serial No. 481,084.

My invention relates to an anti-friction spring shackle construction. This application is a division of my application, Serial No. 746,328, filed October 28, 1924, patented March 31, 1931, No. 1,798,864.

It is the principal object of the present invention to provide a shackle of few parts, which will be cheap to manufacture, simple in construction and yet sturdy and serviceable.

It is another object to provide improved lubricant retaining and dust excluding means for a shackle of the character indicated.

Other objects are to provide improved details looking to simplicity, cheapness and serviceability, as will hereinafter appear.

Briefly stated, in a preferred form of the invention I employ a pair of shackle links which may be formed of pressed metal. Each link is provided with spaced apart raceways, which are preferably formed directly on the links. Bearing means, such as pins, to be carried by a frame and a spring are provided with raceways complementary to the raceways on the shackle links, and anti-friction bearing members, such as balls, are interposed between the complementary raceways. The links are suitably positioned relatively to each other and dust is excluded from and lubricant retained on the anti-friction bearing members by means which may include a dust plate covering the raceways or anti-friction bearing members of each shackle link.

In the drawing, which shows, for illustrative purposes only, preferred forms of the invention—

Fig. 1 is a fragmentary end view of the frame and spring connected together by means of a preferred form of shackle, parts being shown in section to illustrate interior construction;

Fig. 2 is an isometric inner view of a shackle link of Fig. 1;

Fig. 3 is an isometric view of the lubricant retaining and dust excluding means illustrated in Fig. 1;

Fig. 4 is a longitudinal, substantially central, sectional view of a modified form of link;

Fig. 5 is an outside view in side elevation of the link shown in Fig. 4;

Fig. 6 is a fragmentary view of a modification illustrating a link having a raceway thereon but formed on a separate ring or cup.

In said drawing, 1 indicates a portion of a frame or the like, while 2 indicates a portion of a leaf spring or the like which is to be connected to the frame 1. The frame bearing means may be in the form of a pin 3 extending beyond the sides and having anti-friction bearing member raceways, in this particular illustration raceways 4 formed directly thereon. The spring 2 may be provided with a duplicate pin 5, having raceways 6 at opposite sides of the spring. The pins 3 and 5 are rigidly and securely held in the bores or eyes of the frame and spring in any suitable manner.

A pair of shackle links 7—7, which are preferably duplicates of each other, serve to connect the frame and spring. In the form illustrated in Figs. 1 and 2 each link is formed of pressed metal, providing an intermediate link portion 8 having upstanding flanges 9—9 at opposite sides, thus forming a substantially channel-shaped link. This generally channel-shaped form of link is quite strong and rigid. The link is provided with spaced apart raceways 10—10 formed directly thereon, in the form shown, at opposite ends of the link 7. The raceways are preferably in substantially cup-shaped portions, the flange or edge portions 11—11 of which preferably merge into flange portions 9—9, so that there is a continuous flange about the entire link. Anti-friction bearing members, such as balls 12—12, are interposed between the complementary raceways of the pins 3—5 and the raceways 10—10 of the links. The links 7—7 may be held together or in position by means of a through-bolt 13, having a head 14 at one end and a nut 15 at the opposite end. I prefer to space the links apart by means such as a sleeve 13' interposed between the links 7—7 and preferably surrounding the through-bolt 13.

In order to retain lubricant on and exclude dust from the anti-friction bearing members I may employ means extending between the links. In the form shown I employ a plate 16, preferably fitting within the channel-shaped intermediate portion of the link and extending over the raceways 10—10 and balls at each end of the link. The plate 16 is provided with passages which, as illustrated, are apertures for the passage of pins 3—5. A resilient ring 17 may surround each of the pins 3—5 and, if desired, may be held in place in cups 18 on the ends of the plate 19 which, with the plate 16, may be sandwiched in between the spacer 13' and the links, so that when the shackle is assembled all parts will be properly positioned. The shackle links and plates are provided with appropriate passages for the through-bolt 13.

It will be seen that the raceways may be formed directly upon the links 7—7 by the stamping or pressing operation, and the raceways 10—10 may or may not be finished, as by grinding.

Lubricant will be retained on and dust will be excluded from the anti-friction bearing members by the means heretofore disclosed, so that, with the space about the anti-friction bearing members filled with grease, there will be little likelihood of the bearing ever running dry. The parts are all simple and relatively cheap to manufacture.

In the form of link shown in Figs. 4 and 5 the raceways 10'—10' may be formed as heretofore indicated directly upon the links. In addition to the inwardly extending flanges, such as 9', at opposite sides of the central portion 8' there may be a double flanged portion 20 extending oppositely to the side flanges, such as 9'. Thus, the link may be strengthened, if found desirable.

Instead of forming the raceways directly upon the surfaces of the links, as disclosed in Figs. 1, 2, 4 and 5 I may provide the raceways in the form of a cup or ring 21, properly seated in each link, as disclosed in Fig. 6. The construction otherwise may be the same as heretofore described.

It will be seen that I have provided a relatively simple anti-friction spring shackle, the parts of which may be easily and cheaply manufactured. The shackle will be strong and durable and lubricant will be effectively retained.

While the invention has been disclosed in considerable detail and various forms illustrated, I wish it understood that various changes may be made within the scope of the invention as defined in the appended claims.

I claim:

1. In an anti-friction spring shackle, a pair of shackle links each having spaced apart bearing raceways formed directly thereon, anti-friction bearing members on said raceways, means to be carried by a frame and spring and having raceways complementary to said first mentioned raceways and engaging said anti-friction bearing members thereon, and a plate for each of said shackle links and having parts extending over said anti-friction bearing members of each of said raceways on said link.

2. In an anti-friction spring shackle, a pair of shackle links having spaced apart anti-friction bearing member raceways, means to be carried by a frame and a spring and having raceways complementary to said first mentioned raceways, anti-friction bearing members interposed between said complementary raceways, and a plate for each said shackle link and extending over the anti-friction bearing members of each of the raceways of said link.

3. In an anti-friction spring shackle, a pair of shackle links having spaced apart raceways, means to be carried by a spring and frame and having raceways complementary to said raceways of said shackle links, anti-friction bearing members interposed between said complementary raceways, a dust plate for each said shackle link extending between said raceways, and means for spacing said links apart and holding the same together, said means serving to retain said dust plate in place.

4. In an anti-friction spring shackle, a pair of shackle links having spaced apart raceways, means to be carried by a spring and frame and having raceways complementary to said first mentioned raceways, anti-friction bearing members interposed between the complementary raceways, dust excluding and lubricant retaining means for said anti-friction bearing members, and means for positioning said shackle links relatively to each other and for positioning said dust excluding and lubricant retaining means.

5. In an anti-friction spring shackle, shackle links having spaced apart bearing raceways thereon, means to be carried by a spring and a frame and having raceways complementary to said first mentioned raceways, anti-friction bearing members interposed between the complementary raceways, a plate for each said shackle link and having an aperture therein substantially concentric with the raceways of each said link, and means for positioning said links relatively to each other and for holding said plates in place.

6. In an anti-friction spring shackle, a pair of substantially channel-shaped links having spaced apart bearing raceways, a plate in the channel portion of each of said links and extending over said raceways, each said plate having an aperture substantially concentric with the raceways of said links, means to be carried by a spring and frame and having raceways thereon complementary to the raceways of said shackle links and extending through the apertures in each said plate, anti-friction bearing members interposed between the complementary raceways, and means for positioning said shackles.

7. In an anti-friction spring shackle, a pair of shackle links having spaced apart raceways, means to be carried by a spring and frame and having raceways complementary to said first mentioned raceways, anti-friction bearing members interposed between the complementary raceways, plate means extending over the anti-friction bearing members, an annular ring member for each raceway of each said shackle link, and means for positioning said links and holding said plate means in place.

8. In an anti-friction spring shackle, a pair of shackle links having spaced apart raceways, anti-friction bearing members on said raceways, a plate extending from one raceway to the other, said plate having an aperture substantially concentric with each said raceway, pin means to be carried by a spring, pin means to be carried by a frame, said pin means extending through the apertures in said plate and engaging the anti-friction bearing members on said raceways, a tubular spacer member interposed between said shackle links and engaging said plate, and a through-bolt extending through said links and through said tubular spacer member for drawing said links together, whereby said shackle links will be held in position and said plates will likewise be held in position by said tubular spacer member.

9. In an anti-friction spring shackle, a pair of shackle links having spaced apart raceways, anti-friction bearing members on said raceways, a plate extending along each of said shackle links and over the raceways thereon, means to be carried by a frame and a spring and having raceways complementary to said first mentioned raceways, anti-friction bearing members interposed between the complementary raceways, said plate having passages for said means to be carried by a frame and spring, and means for positioning said shackle links.

10. In an anti-friction spring shackle, a pair of shackle links having spaced apart raceways formed directly thereon, anti-friction bearing members on said raceways, means to be carried by a frame and spring and having raceways complementary to said first mentioned raceways, anti-friction bearing members interposed between the complementary raceways, and means for excluding dust from and retaining lubricant on said anti-friction bearing members.

11. In an anti-friction shackle link, a pressed metal shackle link having bearing raceways formed directly thereon, anti-friction bearing members engaging said raceways, said links each having a substantially channel-shaped portion intermediate said raceways, means to be carried by a frame and spring and having raceways complementary to said first mentioned raceways, anti-friction bearing members interposed between the complementary raceways, means for holding said shackle links relatively to each other, and means for retaining lubricant on and excluding dust from said anti-friction bearing members.

12. In an anti-friction spring shackle, a pair of shackle links having anti-friction bearing member raceway cups formed directly thereon and spaced from each other, anti-friction bearing members on said raceway cups, said links each having a substantially channel-shaped portion intermediate said raceway cups, plate means seated in said substantially channel-shaped portion of each link and having outer portions extending over said raceway cups, and means for holding said links in the position relatively to each other.

13. In an anti-friction spring shackle, a pair of shackle links having spaced apart raceways, anti-friction bearing members thereon, plate means extending over the anti-friction bearing members, said plate means having pin passages therein substantially concentric with said raceways, pin means to be carried by a spring and frame and extending through said pin passages, said pin means having raceways complementary to the raceways of said shackle links, and a dust ring surrounding said pin means adjacent each said bearing cup.

14. In an anti-friction spring shackle, a pair of shackle links having spaced apart raceways, means to be carried by a spring and frame and having raceways complementary to said first mentioned raceways, anti-friction bearing members interposed between the complementary raceways, means for positioning said links relatively to each other, and lubricant retaining and dust excluding means, including a plate, extending between the raceways of each said link and extending thereover and having a passage therein adjacent each said raceway for permitting the passage of said means to be carried by a spring and frame.

15. A lubricant retaining and dust excluding means for a spring shackle, including an elongated plate member having spaced apart passages therein, and yielding rings adjacent said passages.

16. A lubricant retaining and dust excluding means for a spring shackle, including a plate having spaced apart passages therein, a yielding dust ring adjacent each of said passages, and cup means for holding each of said resilient rings.

17. In a lubricant retaining and dust excluding means for a spring shackle, a pair of plates having alined passages therein, and a yielding ring interposed between said plates.

18. A lubricant retaining and dust excluding means for a spring shackle, including a pair of spaced apart cup members, yielding rings carried by said cup members, and a plate having spaced apart apertures substantially concentric with said yielding rings.

19. A lubricant retaining and dust excluding means for a spring shackle, including a plate having spaced apart rounded portions, and yielding rings seated in said rounded portions.

20. A shackle link, comprising a substantially channel-shaped member having anti-friction bearing member raceways formed directly thereon and spaced from each other.

21. In a spring connection, a pair of sheet metal members having opposed raceways for anti-friction bearing members formed directly thereon, anti-friction bearing members on said raceways, and means having raceways complementary to said first mentioned raceways and engaging said anti-friction bearing members.

WILLIAM C. BETZ.